United States Patent [19]

Smith

[11] Patent Number: 4,686,855

[45] Date of Patent: Aug. 18, 1987

[54] INFLATION PRESSURE INDICATOR FOR VEHICLE TIRES

[76] Inventor: Noel Smith, 112 Federation Drive, Bethania Waters, Queensland, 4205, Australia

[21] Appl. No.: 780,693

[22] Filed: Sep. 26, 1985

Related U.S. Application Data

[63] Continuation-in-part of Ser. No. 644,956, Aug. 28, 1984, abandoned, which is a continuation-in-part of Ser. No. 385,376, Aug. 26, 1982, abandoned.

[30] Foreign Application Priority Data

Aug. 26, 1985 [WO] PCT Int'l Appl. .................. PCT/AU85/00202

[51] Int. Cl.⁴ .................. B60C 23/04; G01L 7/16; G01L 19/04
[52] U.S. Cl. .................. 73/146.8; 73/708; 73/744; 340/58
[58] Field of Search .................. 73/146.8, 146.2, 146.3, 73/146.4, 146.5, 708, 7.44, 7.45, 7.46; 340/58

[56] References Cited

U.S. PATENT DOCUMENTS 4,136,560  1/1979  Gellos .................. 73/744
4,244,214  1/1981  Curran .................. 73/146.8

*Primary Examiner*—Donald O. Woodiel
*Attorney, Agent, or Firm*—Kimmel, Crowell & Weaver

[57] ABSTRACT

An inflation pressure indicator (100) for pneumatic tires for vehicles has a body (101) mountable on a wheel rim (149) to which a tire is fitted. A piston (122) is slidably mounted in a bore (102) in the body (101), and, at a preselected pressure, moves in the bore (102) against the compression spring (125) to a position adjacent a datum line (136) on the body (101). A tire valve (130) is fitted to the piston (122) to enable the tire to be inflated or deflated, when an air hose fitting is connected to the body (101). By selective injection moulding of the body (101) from polycarbonate, the length of the body (101) will increase with increased heat so that the indicator (100) will correctly indicate the cold tire pressure when the tire is hot.

10 Claims, 7 Drawing Figures

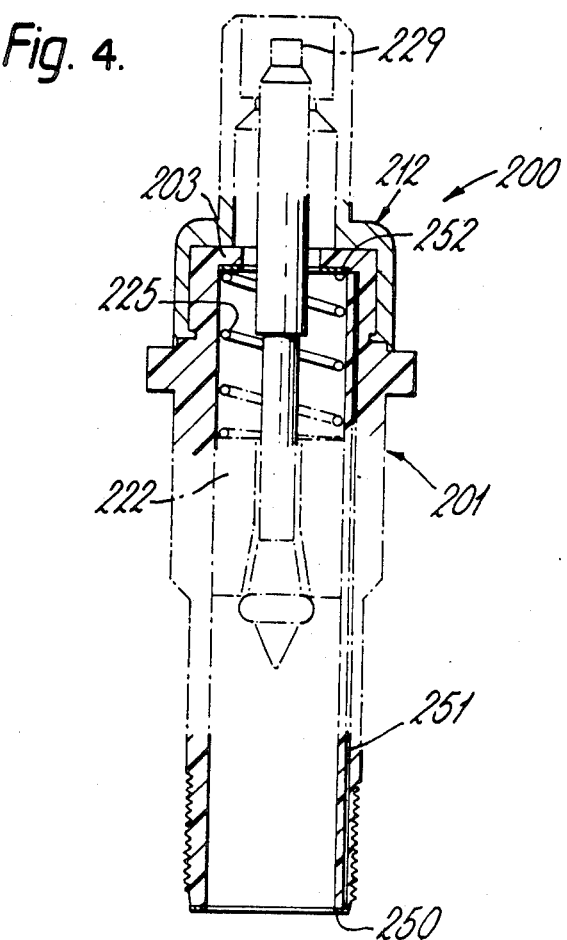
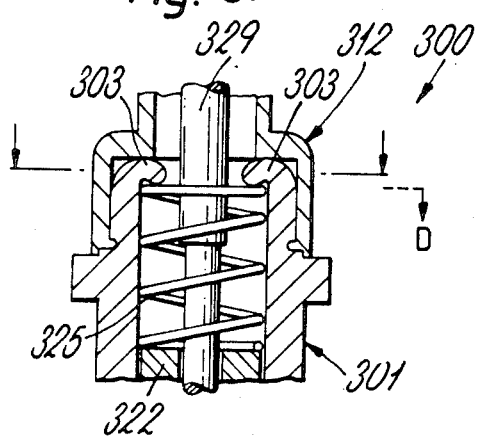
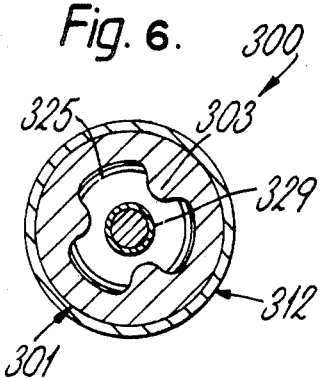

INFLATION PRESSURE INDICATOR FOR VEHICLE TIRES

CROSS REFERENCE TO RELATED APPLICATIONS

This is a continuation-in-part of U.S. application Ser. No. 644,956, filed Aug. 28th 1984, (now abandoned) which was a continuation-in-part of U.S. application Ser. No. 385,376, filed Aug. 26th 1982 (now abandoned).

BACKGROUND OF THE INVENTION

1. Field of the Invention

This invention relates to an inflation pressure indicator for vehicle tires. The term vehicles includes, inter alia, passenger vehicles, trucks, tractors, motor cycles, aircraft and other vehicles fitted with pneumatic type tires.

2. Description of the Prior Art

For maximum safety, the tires of automobiles and other vehicles must be maintained within defined inflation pressure limits set down by the tire manufacturers. If the tires are operated when under-inflated, the excess heat generated in the tire casing as it flexes may cause the casing to fail, while over-inflation of the tire reduces the effective contact area between the tire tread and the pavement and the risk of blowouts is also markedly increased.

Conventionally, it has been necessary to use a separate tire pressure gauge to check the inflation pressure in the vehicle tires. However, tests by motoring organizations have shown that the pressure gauges provided on the forecourts of garages and service stations are often inaccurate and errors of 14–28 Kpa (2–4 p.s.i) have been recorded.

One proposal to overcome this problem was to provide each vehicle tire with a cap which screwed onto the tire stem. The cap opened the tire valve and the pressure in the tire operated a piston which had a piston rod graduated in Kpa (psi) to indicate the inflation pressure. This type of cap had a number of disadvantages. Firstly, the readings given were often inaccurate and the piston rod often became stuck due to the ingress of dust into the cap. Secondly, air leaks developed in the cap and the tires became deflated. Thirdly, the cap had to be removed from the valve to enable the tires to be inflated. Because of these and other problems, these caps were found to be not acceptable.

BRIEF SUMMARY OF THE PRESENT INVENTION

It is an object of the present invention to provide an inflation pressure indicator for vehicle tires which may be connected to the tire stem or be provided with an integral spud or means to enable it to be fitted to a wheel on which a tire is mounted.

It is a preferred object to provide an indicator which is simple to use and which can be sold preset to indicate a particular (cold) inflation pressure on the tire.

It is a further preferred object to provide an indicator which incorporates the tire valve and enables the tire to be inflated or checked against a master gauge without the necessity to remove any portion of the indicator during such inflation or checking steps.

It is a still further preferred object to provide an indicator which can be operated, with a suitable fitting, to enable rapid inflation of the tire.

It is a still further preferred object to provide temperature compensation means in the indicator so that it will yield the "cold" air pressure reading even when the tire is hot.

Other preferred objects of the present invention will become apparent from the following description.

In one aspect the present invention resides in an inflation pressure indicator for pneumatic-tires for vehicles, said indicator including:

a body mountable on a wheel fitted with a tire;

an axial bore in the body adapted to communicate with the interior of the tire;

a piston means slidably mounted in the axial bore;

sealing means between the piston means and the axial bore;

compression means in the tubular body acting on the piston means in opposition to the inflation pressure in the tire; and visual indicator means in or on a substantially transparent portion of the body; so arranged that at a preselected inflation pressure in the tire, the piston means will be moved against the compression means to a position substantially adjacent the visual indicator means.

Preferably a plug is mounted in the axial bore and the compression means include a compression spring interposed between the plug and the piston means, the plug being movable to enable adjustment of preselected inflation pressure. A bore is provided through a plug to enable the tire to be inflated when an air hose is connected to the tubular body.

A dust cap, having a fitting to receive an air hose, may be removably fitted to the tubular body and is provided with a plunger operable to open the tire valve to enable the tire to be inflated. Preferably a second valve is mounted in the cap. The second valve normally closes a bore through the cap and is operable to enable the tire to be inflated or to enable any air in the axial bore between the piston and the plug to be vented to the atmosphere.

In a second aspect, the invention resides in an inflation indicator for pneumatic tires for vehicles, said indicator including:

a body mountable on a wheel fitted with a tire;

an axial bore in the body adapted to communicate with the interior of the tire;

a piston means slidably mounted in the axial bore;

sealing means between the piston means and the axial bore;

compression means in the body acting on the piston means in opposition to the inflation pressure in the tire;

datum means in or on a substantially transparent portion of the body; and visual indicator means on the piston means, so arranged that at a preselected cold inflation pressure of the tire, the piston means will be moved against the compression means to a position where the visual indicator means is adjacent the datum means; characterized in that:

as the inflation pressure in the tire increases due to heat generated in the tire, the increased inflation pressure moving the piston means against the compression means, the heat transmitted to the body causes the body to increase in length in an axial direction, but without any increase in the diameter of the axial bore, so that the visual indicator means remains adjacent the datum means to indicate the cold inflation pressure of the tire, the body acting as a temperature compensator for the increased hot inflation pressure in the tire relative to the cold inflation pressure.

Preferably a central bore is provided in the piston means and a tire valve, normally closing the central bore, is operable to enable the tire to be inflated.

Preferably a shoulder is provided in the axial bore and the compression means include a compression spring interposed between the shoulder and the piston means.

Preferably the visual indicator or datum means is a line scribed or marked on, or an O-ring seated in a groove in, a substantially transparent portion of the tubular body and the piston may be coloured or marked to provide a contrast between the piston and the line.

The tubular body may be screwed or vulcanized onto an existing tire stem, may be provided with an integral spud which is engageable in a hole in the wheel rim, or may be provided with a screw-threaded portion having an abutment shoulder, the screw threaded portion extending through a hole in the wheel rim and the body being secured to the wheel rim by a suitable screw-threaded fastener.

To enable the axial length of the tubular body to be increased to provide the temperature compensation the tubular body may be moulded from polycarbonate where longitudinal spiral flow lines are formed in the tubular body. When heat is transmitted from the wheel, the tubular body undergoes a length wise extension (without an increase in diameter) to move the line the same distance e.g. away from the wheel rim as the piston moves due to the increased pressure of air in the tire as a result of the heat build up in the tire and so the cold inflation pressure reading is retained.

Additional temperature compensation can be provided by conducting heat generated in the tire to the compression spring to cause the latter to expand in opposition to the movement of the piston. A metal wire or strip in or on the tubular body can be provided to conduct the heat from the wheel rim (or the mounting base or spud on the indicator) to the spring. Alternatively, the upper end of the spring can be supported by a plurality of fingers formed of the same material as the tubular body and so arranged that as they are heated, they cause the upper end of the spring to be moved downwardly in opposition to the piston.

BRIEF DESCRIPTION OF SEVERAL VIEWS OF THE DRAWINGS

To enable the invention to be fully understood, a number of preferred embodiments will now be described with reference to the accompanying drawings, in which:

FIG. 4 is a sectional side view of a second embodiment of the indicator (parts being omitted for clarity);

FIG. 5 is a sectional side view of a portion of a third embodiment of the indicator;

FIG. 6 is a sectional end view taken on line 5—5 on FIG. 5; and

DETAILED DESCRIPTION OF THE PREFERRED EMBODIMENTS OF THE INVENTION

Figure 1:
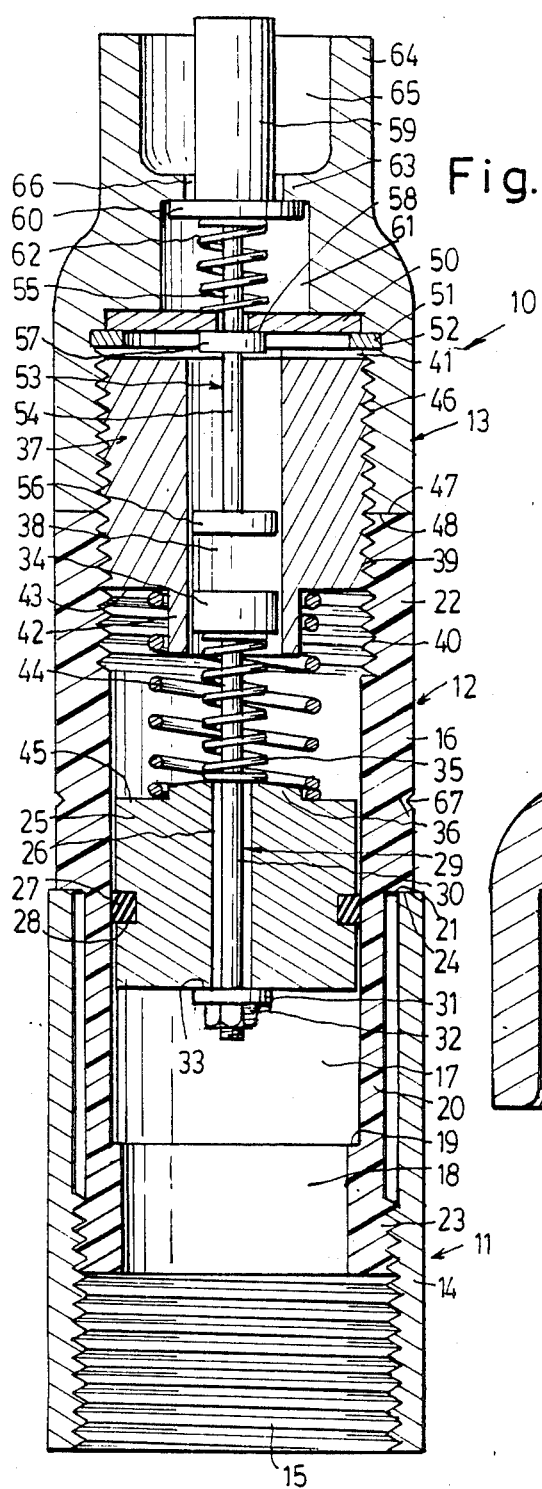
FIG. 1 is a sectional side view of the first embodiment of the indicator.

Referring to FIG. 1, the indicator, generally indicated at 10, is provided in three sections—a bottom section 11, a top section 12 and a dust cap 13.

The bottom section 11 has a tubular body 14 moulded of suitable metal or plastics material. The body 14 has an axial bore 15 which is screw-threaded along its lower portion. The screw-thread 15 enables the bottom section to be fitted onto an existing tire stem (not shown).

The top section 12, has a tubular body 16 moulded of transparent plastics material. An axial bore 17 extends through the body and has a reduced diameter 18 at its lower end. A circumferential abutment face interconnects the two portions of the axial bore. The lower portion 20 of the body 16 has a reduced external diameter and an external circumferential abutment face 21 interconnects the lower portion 20 to the upper portion 22. A screw-thread 23 around the base of the lower portion 20 engages the screw thread 15 in the bottom section 11 to secure the two sections together, while the engagement of the abutment face 21 with the upper end wall 24 of the bottom section provides an airtight seal between the two sections.

An annular piston 25, having a central bore 26 is slidably movable in the axial bore 17 and is fitted with a sealing ring 27 seated in a circumferential groove 28.

A tire valve 29 has its valve stem 30 passing through the central bore 26 in the piston. An annular sealing ring 31 is fixed to the lower end of the valve stem 30 by a screw-threaded nut 32 and engages an annular valve seat 33 around the lower end of the central bore 26 to normally close the bore. A valve head 34 is secured to the upper end of the stem 30 and a compression spring 35 fitted around the stem between the valve head 30 and an inner annular seat 36 on the piston urges the sealing ring 31 into sealing engagement with the annular valve seat 33.

An annular plug 37, with a large axial bore 38, (which receives the valve head 34) has a screw-thread 39 along its length and the lower portion of the plug is engaged in a corresponding screw thread 40 provided in the upper portion 22 of the top section 12. A transverse slot 41 across the top of the plug may be engaged by a screw-driver (not shown) to enable the plug to be screwed in or out of the top section 12. An annular rim 42 is formed around the lower end of the bore 38 and it defines an annular spring seat 43 on the bottom of the plug.

A compression spring 44 is sealed and located on the plug by the spring seat 43 and annular rim 42 respectively and the lower end of the spring 44 engages an outer annular seat 45 on the piston 25. The compression spring 44 acts in opposition to the movement of the piston 25 up the axial bore 17 as the inflation pressure in the tire is increased.

The dust cap 13, moulded from a suitable plastics material, has a screw-threaded lower bore 46 which is screwed, in sealing engagement, on the upper portion of the screw-thread 39 on the plug 37, the lower end wall 47 of the dust cap and the upper end wall 48 of the top section being in sealing abutment.

An annular abutment face 49 is provided at the upper end of the bore 46 to sealably support a secondary valve plate 50 which is secured in position by a circlip 51 engaged in a circumferential groove 52.

The secondary valve 53 has a valve stem 54 which passes through an axial bore 55 in the valve plate and at its lower end, is provided with a foot plate 56 in the bore 38 of the plug 37 and spaced from the valve head 34. A valve seal 57 is provided intermediate the valve stem 54 to normally engage an annular valve seat 58 on the underside of the valve plate 50. An operating knob 59, having an annular rim 60, is fitted to the upper end of the valve stem 54 and the rim 60 is slidably movable in a coaxial bore 61 in the central portion of the dust cap.

A compression spring 62, interposed between the bearing plate 50 and the annular rim 60, urges the valve seal 57 into sealing engagement with the valve seat 58 to close the bore 55, while the rim 60 engages the underside of an annular flange 63 at the upper end of bore 61. The upper portion of the dust cap is of reduced external diameter and comprises an annular ring 64 around an inlet bore 65. The knob 59 extends into the inlet bore through a bore 66 in the flange 63.

A circumferential line 67 is scribed around the body 16 of the top portion 12 and may be fitted with a paint or dye (not shown).

The indicator 10 is used as follows:

the tire valve is removed from the valve stem and the bottom section 11 is screwed onto the valve stem using the screw thread 15. The piston 25 is urged into engagement with the abutment face 19 by the compression spring 44.

To inflate the tire, an air hose (not shown) has its nozzle connected to the ring 64 of the dust cap. The nozzle depresses the knob 59 to open the secondary valve 53 against the compression spring 62. The valve seal 57 and the rim 60 are moved out of engagement with the seal plate 50 and annular flange 63 respectively.

Air under pressure from the nozzle passes through the dust cap and plug and enters the bore 17. The air pressure overcomes the seating pressure applied by the compression spring 35 to move the seal ring 31 away from the annular seat 33 on the piston, and the air flows through the bore 18 into the tire.

Periodically, the operator checks the approximate pressure in the tire using the gauge provided on the air hose.

When a desired pressure is reached e.g. 210 KPa (30 p.s.i), the air hose is disconnected and the knob 59 returns to its original position, closing the secondary valve 53. As the air pressure on both sides of the piston 25 is substantially equal, the compression spring 44 holds the piston against the abutment face 19.

The operatpr depresses the knob 59 to open the secondary valve 53 to bleed any air out of the bore 17 above the piston 25 in the plug 37 and dust cap 13.

The inflation pressure e.g. of 210 KPa (30 p.s.i) in the tire acting against the underside of the piston 25 will move the piston upwardly in the bore 17 against the compression spring. If the actual inflation pressure in the tire equals the required inflation pressure, the upper face of the piston 25 will be aligned with the scribed line 67 on the top section. If the inflation pressure is below the selected pressure, the piston will be below the line 67 and vice versa.

In use, air may leak past the seal 27 into the portion of the bore 17 above the piston 25. This air will not escape to the atmosphere due to the presence of the secondary valve 53. However, as this air will apply a partial balancing force on the piston against the inflation pressure in the tire, the piston will be moved below the scribed mark 67. Before the inflation pressure is checked (while the tire is cold), the knob 59 is depressed to open the secondary valve 53 to bleed the air out of the bore 17. The piston 25 will move up the bore 17 to indicate if the inflation pressure is correct.

When air is to be added to the tire to bring the inflation pressure upto the required pressure, the air hose fitting is connected to the dust cap 13 as discussed above. When the knob 59 is depressed by the fitting, it will open the secondary valve 53, and simultaneously, open the tire valve 29 as the foot plate 56 will move downwardly to engage the valve head 34, moving the latter to unseat the sealing ring 31. When the fitting is removed the tire and secondary valves 29, 53 will be closed. The operator depresses the knob 59 to bleed the air out of the bore 17 above the piston 25 and the latter moves upwardly against the compression spring 44 to indicate the inflation pressure in the tire.

To enable the indicator 10 to be used for a range of inflation pressures, e.g. 196–224 KPa (28–32 p.s.i), the plug 37 may be screwed up or down in the top section 12. The dust cap 13 (and the secondary valve 53) are unscrewed and a screw driver fitted to the transverse slot 41 in the plug. By rotating the plug e.g. one (1) turn, the preselected inflation pressure may be varied by 7 PKa (1 p.s.i). For example, if the compression spring 44 is tensioned so that the piston 25 will be adjacent the scribed line 67 when the inflation pressure is 210 KPa (30 p.s.i), rotating the plug 37 to screw it two turns into the top section 12 will adjust the preselected inflation pressure to 224 KPa (32 p.s.i). In this manner, three different models of the indicators can be manufactured and sold to cover the most common range of inflation pressures for passenger vehicles i.e. 168–252 KPa (24–36 p.s.i). Alternatively, the indicators may be fixedly set at a particular inflation pressure, no means for adjusting this pressure being provided.

While the bottom section 11 has been described as being screw-threaded onto a conventional valve stem, in an alternative embodiment, it may be supplied with a plain section to be vulcanized to a tire stem.

Alternatively, the bottom section may be provided with an integral spud for direct connection to the wheel rim, or with an externally threaded portion terminated by an abutment face to be mounted on and secured to the wheel rim. The bottom section may be sold direct to tire manufacturers, while the top section and dust cap is sold through garage and accessory shops in e.g. packs of four so that the user selects a set to suit the intended inflation pressure of his vehicle tires and he sets the indicators to the required inflation pressures before fitting them to his vehicle.

A conventional dust cap is not required with the indications as the engagement between the annular rim (on the knob 59) and the annular flange 63 prevents the ingress of dirt or other material into the indicator.

While it is preferred that the body 16 of the top section 12 be formed of substantially transparent material, a transparent window having a scribed or painted mark would be sufficient to enable the piston 25 to be viewed.

Figure 2:
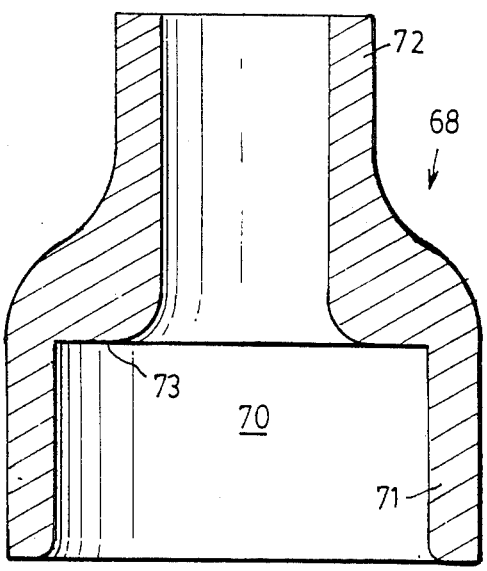
FIG. 2 is a sectional side view of a rapid-inflation fitting.

In certain applications, e.g. truck and tractor tires, the presence of the indicator may make inflation of the tire very slow. To overcome this problem, the top section 12 is unscrewed from the bottom section and the rapid inflation fitting 68 of FIG. 2 is used. The fitting 68 has an annular body 69 with a stepped axial bore 70 of increased diameter in its lower portion 71. The upper portion 72 of the body has an annular ring similar to the annular ring 64 on the dust cap.

The top section 12 and dust cap 13 are removed and the fitting 68 is pushed onto the bottom section 11, the upper end wall 24 of the latter engaging an annular abutment face 73 in the fitting. An air hose is connected to the fitting and air is pumped into the tire to a pressure above the preselected inflation pressure.

The fitting is quickly removed and the top section 12 screwed into the bottom section 11. The inflation pressure of the tire is checked as described above and additional air pumped into the tire, or bled therefrom, until the required inflation pressure is obtained.

Figure 3:
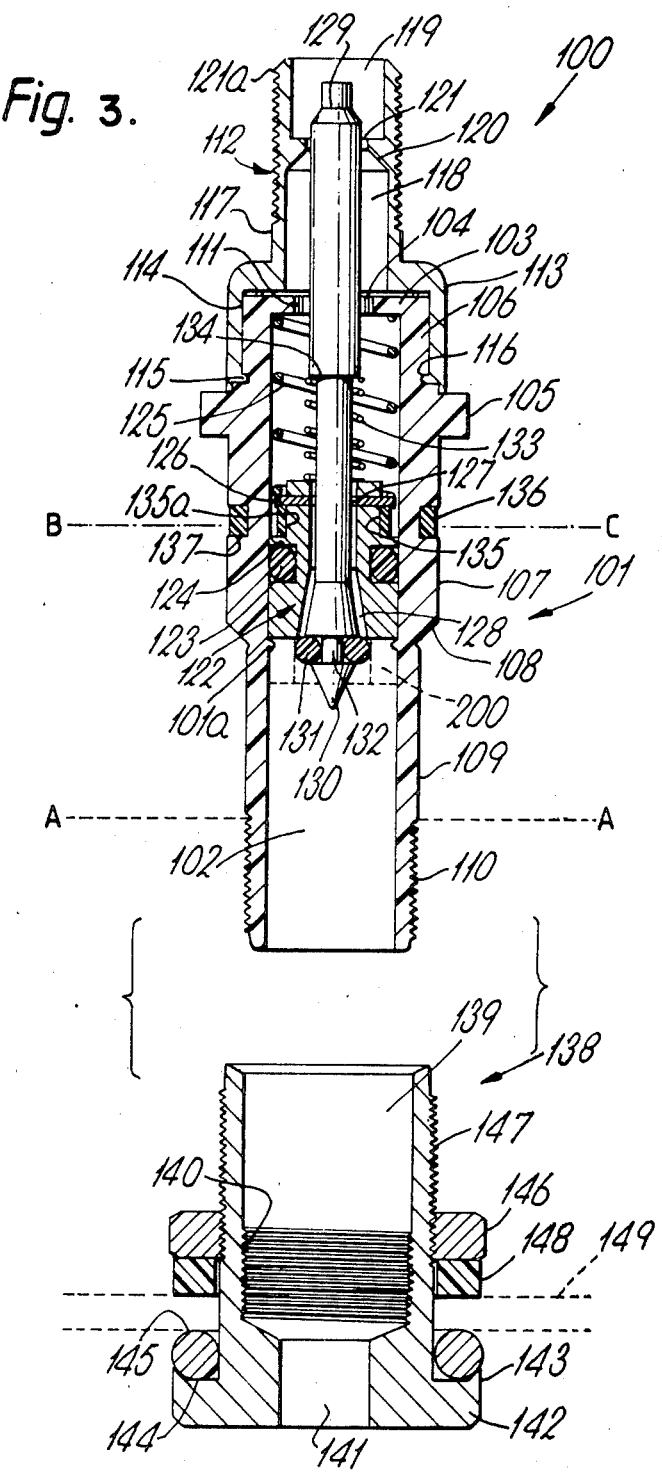
FIG. 3 is a sectional side view of one embodiment of the indicator.

Referring to FIG. 3, the indicator, generally indicated at 100, has a tubular body 101 injection moulded of polycarbonate, the moulding method to be hereinafter described.

The tubular body 101 has a plain central bore 102 with an inturned flange 103 at the upper end with a co-axial bore 104 of reduced diameter. A hexagonal nut 105, integral with the body 101, divides the upper and central portion 106, 107 of the body, while a downwardly convergent abutment face 108 divides the central and lower portion 107, 109. A left-handed screw thread 110 is formed around the base of the lower portion 109 and air holes 101 are formed in the inturned flange 103.

The tubular body 101 is moulded from polycarbonate using a torpedo-type injection head, the body being moulded from the upper portion 104 end of the body. As the body is moulded, longitudinally spiralling flow lines of the polycarbonate are formed and the high moulding pressures employed (e.g. twice the normal moulding pressures) ensures a tight packing of the spiral flow lines. The resultant body is noted to extend lengthwise with an increase in temperature with no discernable increase in the internal diameter of the central bore 102.

A top cap 112 (of aluminium) has a lower portion 113 with a bore 114 to receive the upper portion 106 of the tubular body and an inturned peripheral flange 115 engages in a complementary circumferential groove 116 around the body to lock the cap to the body. The upper portion 117 of the cap has a reduced diameter bore 118 separated from the mouth 119 by a flange or rib 120 with a bore 121.

A screw threaded portion 121a is provided on the upper portion 117 to receive a complementary dust cap (not shown).

A piston 122 is slidably mounted in the bore 102 of the body 101 and is sealed thereto by a redcoloured O-ring seal 123 received in a circumferential groove 124. A compression spring 125, seated on the inturned flange 103, bears against the abutment seat 126 on the top of the piston. A crimped portion 101a of the body retains the piston in the bore 102.

A bore 127 through the piston has a tapered valve bore at its lower end.

A plunger 129 is slidably received in the bores 104, 127, with a working clearance and a valve member 130 at the lower end of the plunger has a sealing O-ring 131 retained in a circumferential groove 132 in the valve member 130, to sealably engage the tapered valve bore 128.

A compression spring 133 is provided around the plunger 129 and is interposed between the top of the piston 122 and an abutment face 134 on the plunger to urge the valve member 130 and sealing 131 into sealing engagement with the valve bore 128.

A green O-ring 135 is fitted in a circumferential groove 135a around the piston (spaced from the tubular body wall) while a black O-ring 136 is fitted to a circumferential groove 137 around the body 101.

A base section 138, of aluminium, has a bore 139 to receive the lower portion 109 of the body 101 and is releasably connected thereto by screw threads 140 at the base of the bore 139 which co-operate with the screw thread 110. A reduced diameter bore 141 extends through the base portion 142 which has a peripheral flange 143 with a grooved face 144 to receive an O-ring seal 145. A nut 146 is received on the screw threaded upper portion 147 of the base section and bears against a rubber washer 148, the wheel rim 149 being clamped between the O-ring seal 145 and rubber washer 148.

The indicator 100 is used as follows:
the base section 138 is fitted to the wheel rim 149 and is clamped in position by the nut 146. The indicator is assembled as shown and is screwed into the base section. Using a conventional air hose, the tire is inflated, the air passing around the plunger 129 and urging the valve member 130 and O-ring sealing 131 off the valve bore 128.

While the tire is being inflated to the desired pressure (e.g. 32 p.s.i), the piston 122, which is unseated from the crimped portion 101a, moves up against the compression coil spring 125 until the red coloured O-ring seal 123 is concealed by the black O-ring 136 and the green O-ring 135 is visible. The air hose is removed and the compression spring 133 causes the valve member 129 and O-ring 130 to sealably engage the valve bore 128, closing the valve.

The tire is now at its correct cold inflation pressure. As the air in the tire heats up, it expands and tends to push the piston 122 upwardly relative to the base portion 138. Using line A as a datum, the distance A-B tends to increase, where line B represents the position of the green O-ring 135 on the piston 122. However, the heat transmitted from the wheel rim 149 via the base section 138 heats the tubular body 101 and it undergoes longitudinal extension at a rate which matches the movement of the piston, i.e. the heat causes the distance A-C to increase, where line C represents the position of the black O-ring 136. As the increase in the distance A-C is the same as the increase in the distance A-B, the green and black O-rings 135, 136 remain in the same relationship, the green O-ring 135 being exposed, to indicate the cold inflation pressure.

In this manner, the tubular body 101 acts as a temperature compensation for the increased hot inflation pressure in the tire.

Referring to the embodiment of FIG. 4, the indicator 200 is of generally the same construction as the indicator 100 of FIG. 3. However, in certain applications, insufficient heat may be transmitted to the tubular body 201 to provide sufficient elongation to compensate for the movement of the piston 222. This problem may arise on large vehicles which have the indicators fitted on long stems to provide access to the indicator for inflation and checking.

In this indicator, at least portion of the piston movement is opposed by conducting heat from the wheel rim or base section to the compression spring 225, causing the latter to expand in opposition to the piston. As the upper end of the spring 225 is supported by the shoulder 203 on the tubular body 201, it must be the lower end of the spring 225 which moves downwardly as the spring expands and so this expansion will oppose the piston movement upwardly. To effect the heat conduction, an annular metal disc 250 is provided at the lower end of the tubular body 201 to contact the base section 138. A metal wire or strip 251 conducts the heat to a second metal disc 252 interposed between the annular flange 203 in the tubular body 201 and the upper end of the spring 225.

Referring now to FIGS. 3 and 6, the indicator 300 of a third embodiment has a tubular body 301 generally similar to the tubular body 101 of the embodiment of FIG. 3. However, the flange 103 is replaced by a plurality (e.g. three) inwardly directed fingers 303 formed integrally with the tubular body 301 and forming the shoulder for the upper end of spring 325. As the tubular body 301 is heated, the fingers 303 undergo extension in length and their downward orientation pushes the spring 325 downwardly (in the direction of arrow D) to oppose the upward movement of the piston 322 due to increased pressure in the tire due to the heat build-up.

It will be readily apparent to the skilled addressee that the embodiments of FIGS. 4 and FIGS. 5 and 6 can be combined, the annular disc 252 being interposed between the distal ends of the fingers 303 and the upper end of the spring 325.

Figure 7B:
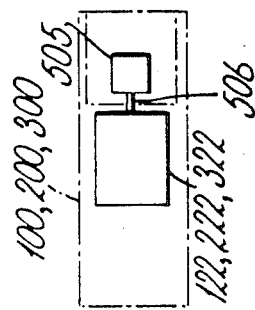
FIG. 7A is a schematic circuit diagram of an underinflation warning circuit with FIG. 7B being an enlarged detail of the encircled portion of the front wheel of FIG. 7A.
Figure 7A:
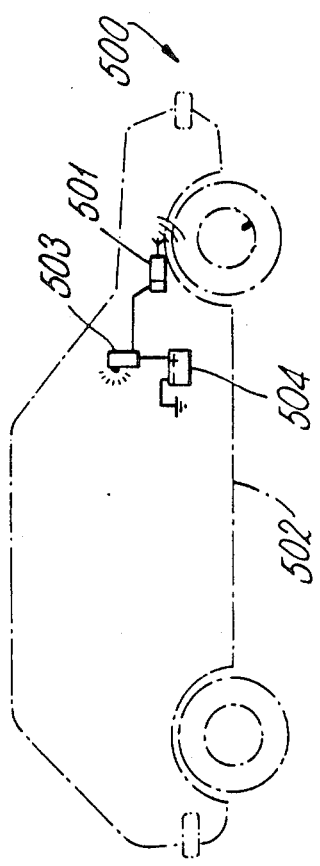

To provide warning of deflation, or under inflation of the tire, an alarm system 500 may be provided, as shown in FIG. 7.

A small transmitter/receiver 501 is mounted under the mudguard or fender of the vehicle 502. The transmitter section transmits a very low power signal (with a range of e.g. 1 meter) at a first frequency and the receiver section is tuned to receive a signal at a second frequency. When such a signal is detected by the receiver section, an audible and/or visual alarm unit 503 mounted within the vehicle is operated to warn the driver. The transmitter/receiver 501 and the alarm unit 503 are powered by the vehicle's battery 504.

A passive micro-minaturized circuit 505, e.g. of the type used in "bugs", is mounted within the indicator 100, 200, 300, receives the signal at the first frequency from the transmitter and retransmits it at the second frequency. However, as the circuit 505 does not have an aerial, the retransmitted signal is not detected by the receiver.

If the inflation pressure in the tire should fall, the piston 100, 200, 300 moves downwardly in the tubular body of the indicator (e.g. until the piston engages the crimped portion 101a in the tubular body 101 of indicator 100). When the piston engages a probe 506 on the circuit 505, the piston 122, 222, 322 (and the plunger 129, 229, 329) act as an aerial for the circuit 505 and so the retransmitted signal at the second frequency is detected by the receiver section 501 to trigger the alarm unit 503. (The piston and plunger will also act as an aerial for the first frequency signal detected by the circuit).

It will be readily apparent to the skilled addressee that various changes and modifications may be made to the embodiments described without departing from the scope of the present invention defined in the appended claims.

I claim:

1. An inflation indicator for pneumatic tires for vehicles, said indicator including:
a body mountable on a wheel fitted with a tire;
an axial bore in the body adapted to communicate with the interior of the tire;
a piston means slidably mounted in the axial bore;
sealing means between the piston means and the axial bore;
compression means in the body acting on the piston means in opposition to the inflation pressure in the tire;
datum means in or on a substantially transparent portion of the body; and
visual indicator means on the piston means, so arranged that at a preselected cold inflation pressure of the tire, the piston means will be moved against the compression means to a position where the visual indicator means is adjacent the datum means; characterized in that:
as the inflation pressure in the tire increases due to heat generated in the tire, the increased inflation pressure moving the piston means against the compression means, the heat transmitted to the body causes a portion of the body between the wheel and the datum means to increase in length in an axial direction, but without any increase in the diameter of the axial bore so that the visual indicator means remains adjacent the datum means to indicate the cold inflation pressure of the tire, the body acting as a temperature compensator for the increase hot inflation pressure in the tire relative to the cold inflation measure.

2. An indicator as claimed in claim 1 wherein:
the body is injection moulded of polycarbonate material wherein the material flows into the mould in the form of closely packed longitudinal spirals to enable the body to increase its axial length without any increase in the diameter of the axial bore.

3. An indicator as claimed in claim 1 wherein:
a central bore is provided in the piston means;
a plunger is slidably received in the central bore with valve means, normally closing the central bore and operable to enable the tire to be inflated.

4. An indicator as claimed in claim 1 or claim 2 wherein:
a metal wire or strip in the body conducts heat generated in the tire to the compression means to cause the compression means to expand in opposition to the movement of the piston means.

5. An indicator as claimed in any one of claims 1 to 3 wherein:
the compression means is supported in the body by a plurality of fingers formed integrally with the body the fingers being so arranged that the heat generated in the tire causes the fingers to increase in length and move the compression means in a direction opposite to the movement of the piston means.

6. An indicator as claimed in claim 3 wherein:
a compression spring is interposed between the piston means and the plunger to urge the valve means into a position normally closing the central bore.

7. An indicator as claimed in claim 1 wherein:
the compression means includes a compression spring interposed between the body and the piston means.

8. An indicator as claimed in claim 1 wherein:
the body includes a base section connectable to a wheel rim on which is mounted the tire;
a substantially transparent body section sealably connected to the base section, the piston means being provided in the body section; and a cap section engageable by an air hose or an inflation gauge.

9. An under-inflation warning system for pneumatic tires for vehicles including:
an indicator as claimed in claim 1;
a transmitter to be mounted in a vehicle to transmit a lower powered signal of a first frequency;
a receiver to detect a signal of a second frequency; and
an alarm unit operable by the receiver when the second frequency is detected by the receiver, wherein:
a passive circuit is mounted in the body of the indicator, the circuit being engaged by the piston means when the inflation pressure in the tire is below a preset pressure and operable to receive the first frequency signal and retransmit it at the second frequency to be detected by the receiver, the piston means being operable as an aerial for the circuit.

10. A system as claimed in claim 9 wherein:
the transmitter, receiver and alarm unit are powered by a battery in the vehicle; and
the transmitter and receiver are mounted on the vehicle adjacent each tire, the inflation pressure of which is to be monitored.

* * * * *